United States Patent [19]

Inoue

[11] 4,321,450
[45] * Mar. 23, 1982

[54] METHOD OF AND APPARATUS FOR ELECTRICAL DISCHARGE MACHINING WITH A VIBRATING WIRE ELECTRODE

[75] Inventor: Kiyoshi Inoue, Tokyo, Japan

[73] Assignee: Inoue-Japax Research Incorporated, Yokohama, Japan

[ * ] Notice: The portion of the term of this patent subsequent to May 27, 1997, has been disclaimed.

[21] Appl. No.: 60,346

[22] Filed: Jul. 25, 1979

Related U.S. Application Data

[62] Division of Ser. No. 796,369, May 12, 1977, Pat. No. 4,205,213.

[30] Foreign Application Priority Data

| May 14, 1976 | [JP] | Japan | 51-55743 |
| May 20, 1976 | [JP] | Japan | 51-58271 |
| Jul. 21, 1976 | [JP] | Japan | 51-87614 |
| Jul. 23, 1976 | [JP] | Japan | 51-88376 |
| Aug. 19, 1976 | [JP] | Japan | 51-99306 |
| Feb. 18, 1977 | [JP] | Japan | 52-16175 |

[51] Int. Cl.³ .............................................. B23P 1/12
[52] U.S. Cl. ............... 219/69 M; 219/69 W; 219/69 V
[58] Field of Search ............... 219/69 W, 69 V, 69 M, 219/69 R, 69D

[56] References Cited

U.S. PATENT DOCUMENTS

| 2,794,110 | 5/1957 | Griffith | 219/69 W |
| 3,830,996 | 8/1974 | Ullmann et al. | 219/69 W |
| 3,936,653 | 2/1976 | Bals | 219/69 W |
| 4,205,213 | 5/1980 | Inoue | 219/69 W |

FOREIGN PATENT DOCUMENTS

| 50-72290 | 6/1975 | Japan . |
| 507427 | 4/1976 | U.S.S.R. | 219/69 W |

*Primary Examiner*—C. C. Shaw
*Attorney, Agent, or Firm*—Karl F. Ross

[57] ABSTRACT

A method and apparatus of electrically machining a conductive workpiece in which a travelling-wire electrode and the workpiece are relatively displaced transversely to the axis of the travelling-wire electrode and define a machining gap therebetween, a machining liquid is supplied to said gap, and a series of electrical pulses are applied across the workpiece and the electrode to generate machining discharges in the gap to remove material from the workpiece. The improvement comprises imparting a vibration to the travelling wire electrode at a frequency between 1 and 50 KHZ and an amplitude between 1 and 50 microns so that the travelling wire electrode has an undulating oscillatory motion along its axis with more than two nodes and antinodes or loops and with a maximum amplitude smaller than the size of the machining gap.

15 Claims, 12 Drawing Figures

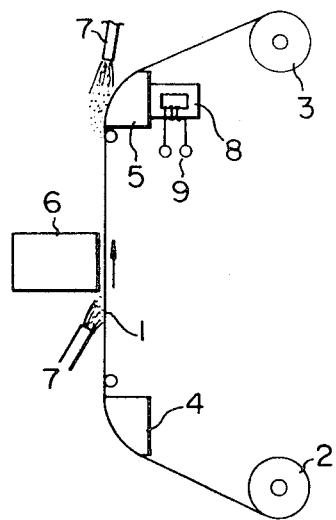
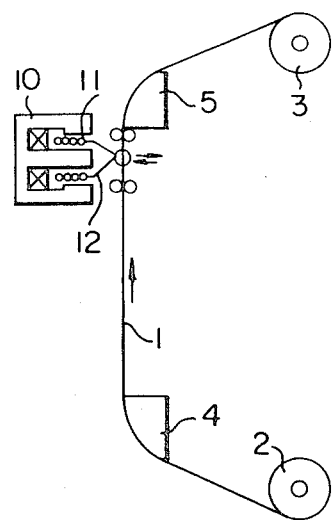
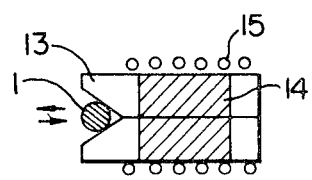
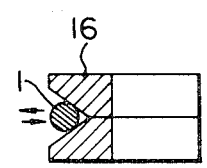
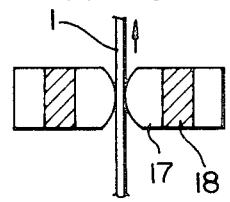
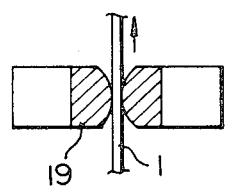

METHOD OF AND APPARATUS FOR ELECTRICAL DISCHARGE MACHINING WITH A VIBRATING WIRE ELECTRODE

This is a division of application Ser. No. 796,369 filed May 12, 1977 (now U.S. Pat. No. 4,205,213 issued May 27, 1980).

FIELD OF THE INVENTION

The present invention relates to electrical-discharge machining (EDM) and, more particularly, to a method of and an apparatus for electrical-discharge machining utilizing a wire electrode caused to travel through a machining zone in a workpiece relatively displaced thereto and transversely to the direction of travel of the wire electrode.

BACKGROUND OF THE INVENTION

In electrical-discharge machining of this type, which is commonly called "wire-cut EDM" or "travelling-wire EDM", the wire electrode held under tension is displaced to travel through a machining zone to be cut in the workpiece and flushed with a machining liquid which is usually a distilled water or liquid dielectric and a series of electric pulses are applied across the machining gap between the wire electrode and the workpiece to effect time-spaced electrical discharges between them to remove material from the workpiece.

Typically, the wire electrode is fed from a supply reel and passes through the machining zone between a pair of support and guide members which act to stretch the travelling wire electrode thereacross and fed to a take-up reel by a drive motor, the tension of the wire electrode between the guide members being controlled by a suitable brake mechanism arranged at a location or locations in the travelling path thereof.

The transverse displacement of the workpiece relative to the travelling-wire electrode to follow the material removal is usually effected automatically by a control system under programmed instructions which define a predetermined cutting path or pattern.

In order to achieve a satisfactory machining accuracy, it is necessary to use a wire electrode as thin as 0.05 to 0.5 mm diameter. This requirement, however, has heretofore imposed restrictions in the machining performance attainable. Such a thin wire, given a desired tension, tends to be broken even with incidental occurrence of arcing or short-circuiting with the workpiece. Thus, the machining efficiency or removal rate achievable has been limited to an unsatisfactory level since the wire breakage is unavoidable when an enhancement of machining or an increase in the rate of relative displacement is attempted.

OBJECTS OF THE INVENTION

It is therefore an object of the present invention to provide a method of electrical-discharge machining of the type described whereby the possibility of occurrence of the breakage of a wire electrode is practically eliminated and an increased machining efficiency or removal rate, without sacrifice of machining accuracy, is obtained.

Another object of the invention is to provide an apparatus for carrying out the method.

SUMMARY OF THE INVENTION

In accordance with the present invention, there is provided a method of electrically machining a conductive workpiece in which a travelling-wire electrode and the workpiece are relatively displaced transversely to the direction of travel of the wire electrode and define a machining gap between them, a machining liquid is supplied to said gap, and a series of electrical pulses are applied across the workpiece and the electrode to generate machining discharges in the gap to remove material from the workpiece, the method being characterized by imparting to the wire electrode a vibration at a frequency not lower than 100 Hz.

It has now been found that by imparting such a vibration to the travelling-wire electrode, it is possible to practically eliminate the breakage of the wire electrode and to permit machining to proceed with stability, thereby enabling removal rate and machining efficiency to be markedly enhanced.

The frequency of the vibration is preferably in a range between 1 and 50 KHz and the amplitude is preferably in a range between 1 and 5 microns but may be as large as slightly smaller than the size of the machining gap, say 50 microns.

The vibration to the wire electrode is imparted in a direction transversely to the axis of the travelling-wire electrode so that an undulating oscillatory motion with more than two nodes and loops is produced in the wire travelling between the two guide members positioned at opposite sides with respect to the workpiece.

By imparting a vibration or undulating oscillatory motion to the wire electrode stretched and axially displaced between a pair of wire-guiding members, it appears that a pumping action is generated in the machining zone to facilitate removal or carrying-away therefrom of machining products, i.e. chips and gases and, even of greater importance a dispersive production of successive discharges in the machining zone over the entire workpiece thickness is assured, thus preventing the discharges from being concentrated on a single point or region of the wire electrode travelling though the workpiece. It is also conceivable, though possibly of less importance, that the contact resistance on the guide surfaces and other contact portions with the wire electrode is substantially reduced.

In accordance with an apparatus aspect of the invention, means for imparting a small vibration to the wire electrode may comprise an electromagnetic vibrator or a sonic or ultrasonic horn arrangement. This may comprise a magetostrictive element or piezo-electric element coupled with corresponding energizing circuitry.

The vibrator or horn is preferably arranged with its vibrating head in contact with one of the two wire guide members through which the travelling wire is guided from or into the machining zone.

Furthermore, the machining liquid as advantageously supplied to the wire as a flow through the location where the vibrating end of the vibrator arrangement comes in contact with the wire so that the heat generated at the vibrating body is sufficiently dissipated to avoid a detrimental heating of the wire electrode.

Preference is also had for keeping the plane of the wire vibration coincident with the direction of the relative displacement of the workpiece to the travelling-wire electrode.

BRIEF DESCRIPTION OF THE DRAWING

These objects, features and advantages of the invention will become more readily apparent from the following description of embodiments thereof, which are given by way of example only, reference being made to the accompanying drawing in which:

FIG. 1 is a diagrammatic cross-sectional view of an apparatus according to the invention;

FIG. 2 is a diagrammatic cross-sectional view of another embodiment of the invention;

FIGS. 3(a), (b), (c) and (d) are enlarged diagrammatic cross-sectional views of certain different embodiments of vibrator arrangements according to the invention;

SPECIFIC DESCRIPTION

Figure 4:
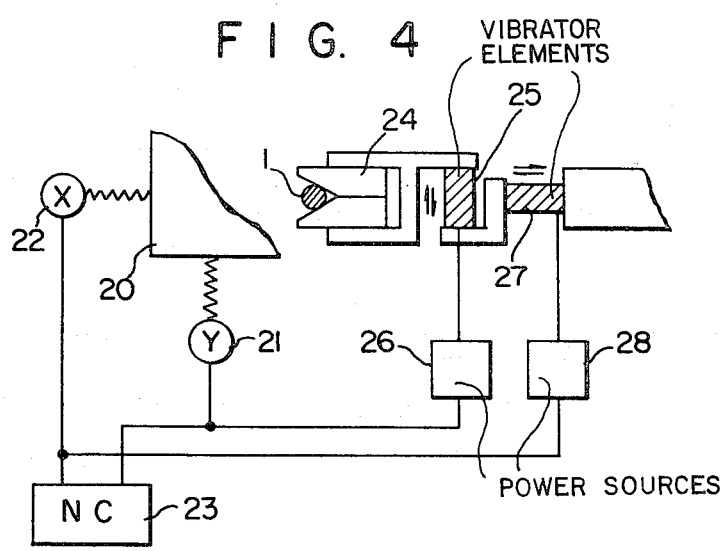
FIG. 4 is a diagrammatic, partly cross-sectional view illustrating another embodiment of the invention.

Referring now to FIG. 1, a wire electrode 1 is shown fed from a supply reel 2 and wound on a take-up reel 3 while being supported and guided by a pair of members 4 and 5. The travelling displacement of the wire electrode 1 is effected by means of a motor (not shown) with a suitable brake mechanism (not shown) being provided to cause the wire 1 to travel under a controlled tension between the support and guide members 4 and 5 and through the machining gap formed between the wire 1 and a workpiece 6 juxtaposed therewith. A pair of nozzles 7 and 7' are provided for supplying a machining liquid to a gap between the workpiece 6 and the travelling wire electrode 1 across which a series of electric pulses are applied from a power source (not shown) to effect machining discharges between them.

The workpiece 6 is secured on a work table (not shown) and a relative displacement is effected between the work table and the wire electrode 1 along x and y axes in a programmed pattern.

In contact with one of the support and guide members 5, there is provided a vibratile magnet 8 energizable by a high-frequency alternating current source 9 of a frequency not lower than 100 Hz to impart a vibration to the wire electrode 1 travelling between the support and guide members 4 and 5 under tension. Thus, if an arc discharge or short circuiting takes place in the machining gap, it can be extinguished mechanically by a high-frequency vibration of the wire electrode. Moreover, the contact friction over the guide members is markedly reduced. Furthermore, the removal of machining products and gases produced in the machining gap which tend to disturb the machining stability is facilitated by the wire vibration with the result that machining is continued with stability without breakage of the wire electrode and an increased removal rate.

The vibration is effected at an amplitude in a range between 1 and 50 microns, preferably 1 and 5 microns and a frequency not less than 100 Hz, preferably in a range between 1 and 50 kHz.

EXAMPLE I

A workpiece of SKD-10 having a thickness of 10 mm was machined using a copper wire electrode of a diameter of 0.2 mm and distilled water having a resistivity of $5 \times 10^4$ ohm-cm. The electric pulses applied had a peak current of 30 amperes, a pulse duration of 10 microseconds and a pulse off-time of 20 microseconds. When no vibration was imparted to the wire electrode, the removal rate was 1.2 mm/minute whereas when a vibration was imparted to the wire electrode at a frequency of 30 kHz and an amplitude of 1 micron at 30 kHz and 3 microns, and at 1 kHz and 2 microns, the removal rate was increased to 2.3 mm/minute, 2.0 mm/minute and 1.8 mm/minute, respectively.

Providing the vibrator 8 for the guide member 5 is especially advantageous. Friction resistance on that portion is thus markedly reduced permitting the wire electrode to be displaced at a high speed and under an increased tension without breakage.

FIG. 2 shows an embodiment of the invention in which a periodic pulling force is applied to the travelling-wire electrode 1 to vibrate it by an arrangement consisting of a magnet 10, a moving coil 11 and a wire 12 provided in the vicinity of one of the guide members 5. Here, the moving coil 11 is energized by a high-frequency alternating-current source (not shown) to apply a vibration with a corresponding frequency to the electrode 1 through the coupling wire 12 in the direction indicated by the arrows shown. The result is that the discharge point, short circuiting point or contact point on the workpiece 6 with the wire electrode 1 shifts or fluctuates constantly so that any short circuiting which may occur is instantaneously extinguished or prevented to protect the wire electrode 1 from breaking, thereby permitting machining to continue with increased stability.

EXAMPLE II

In machining a SKD-10 workpiece of the type described in connection with Example I, when the travelling wire electrode held under tension of 600 g was given a tension change of ±100 g at a frequency of 1 kHz, the removal rate was then 1.9 mm/minute. When the same tension change is effected at a frequency of 3 kHz, the removal rate was 2.0 mm/minute. It has been found that with a tension change in a range between 300 g and 5 g under average tension of 600 g, the frequency between 1 and 50 kHz is preferably used.

FIG. 3 shows different embodiments of the vibrator arrangement according to the invention. More specifically, FIG. 3(a) shows a guide member 13 has a magnetostrictive element or piezoelectric element 14 connected thereto and energizable by a winding 15 to vibrate the wire electrode 1. FIG. 3(b) shows an arrangement in which the guide member is comprised of a magnetostrictive element or piezoelectric element 16. FIG. 3(c) shows a vibrator in which the guide member 17 arranged to receive the travelling-wire electrode 1 has a magnetostrictive element or piezoelectric element 18 connected thereto. FIG. 3(d) illustrates a device in which the guide member 19 itself is comprised of a magnetostrictive or piezoelectric element. The vibrator may be altered by a thermostrictive element or supersonic horn.

By applying a vibration to the wire electrode 1 in the direction coincident with the cutting direction as shown in the embodiment of FIG. 1, it is possible to hold the machining overcut at a small value.

FIG. 4 illustrates an embodiment of the invention in which the direction of vibration is numerically controlled. Here, a work table 20 carrying a workpiece (not shown) is displaced by an x-y plane under numerical control by an X-axis motor 21 and a Y-axis motor 22. The motors are controlledly driven by NC controller 23 to displace the workpiece relatively to the travelling-wire electrode 1 along a programmed path. The electrode guide member 24 has a first vibrator element 25 energized by a power source 26 for vibrating the wire electrode 1 in an X direction and a second vibrator element 27 energized by a power source 28 to vibrate the wire electrode 1 in a Y-direction. Thus, when machining feed is effected along an X-axis by the motor 21, the vibrator 25 is operated to vibrate the wire electrode 1 in the X-direction whereas when machining is along a Y-axis by a motor 22, the vibrator 27 is operated to impart a vibration to the wire electrode 1 in the Y-direction to keep the vibrating direction coincident with the machining direction.

By holding the wire vibration to be made at all times in the direction coincident with the machining direction in this manner, it is possible to achieve an increased accuracy and minimized overcut which is approximately half the overcut that may result with a vibration given without directional control.

EXAMPLE III

A copper wire electrode of a diameter of 0.2 mm, travelled over a lap-surfaced sapphire guide at a speed of travel of 1 m/minute and held under tension of 500 g was used vibrated in the direction held coincident with the machining direction at a frequency of 100 kHz by using a piezoelectric element composed of 55% $PbZrO_3$ and 45% $PbTiO_3$ applied at the guide surface. The resultant machining accuracy and overcut were 25 microns and 21 microns, respectively.

Figure 5:
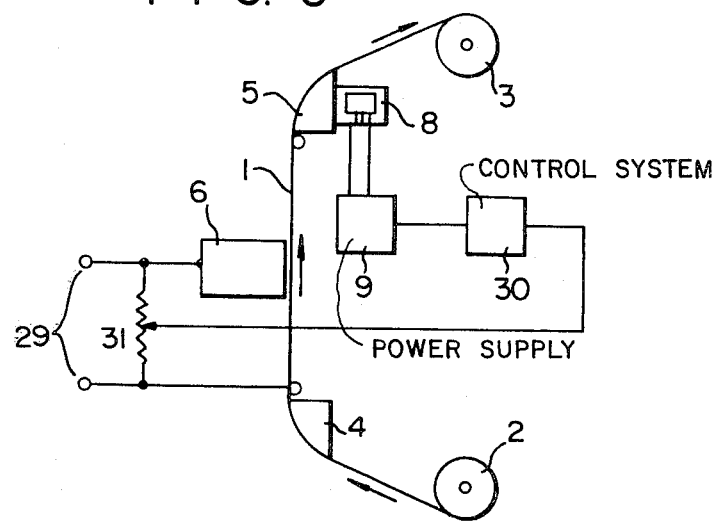
FIG. 5 is a similar view of a further embodiment of the invention including a unit controlling the mode of operation of the vibrator arrangement in response to the condition in the machining zone in accordance with an additional aspect of the invention.

In the embodiment of FIG. 5 in which the same reference numbers are used to indicate the parts which are the same as those in the previous embodiments, there is provided a control system 30 designed to respond to the machining state in the gap between the travelling electrode 1 and the workpiece 6 displaced relatively thereto, there also being shown terminals 29 electrically connecting a power supply (not shown) to the workpiece 6 and the wire electrode 1. Thus, the control circuit 31 leads from a potentiometer 31 shunted across the workpiece 6 and the wire electrode 1 to monitor the voltage across the machining gap thereby controlling the amplitude and/or the frequency of the vibration imparted to the wire electrode 1 by the vibrator 8 through the control of the power supply 9.

Figure 6:
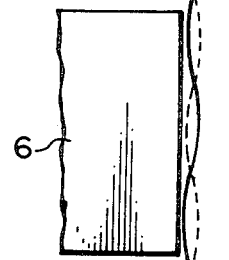
FIGS. 6 and 7 are diagrammatic views illustrating the vibration of the wire electrode in juxtaposition with the workpiece.
Figure 7:
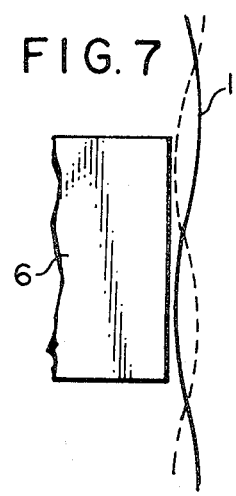

As shown in FIG. 6, an undulating motion is produced in the travelling-wire electrode 1 by imparting a vibration thereto. FIG. 7 shows a similar undulating motion at a lower frequency or with a smaller number of nodes and loops. These FIGURES indicate that by imparting an undulating oscillatory motion to the travelling-wire electrode 1, the workpiece 6 is approached at every instant by a portion or portions of the wire electrode becoming a loop or loops of the undulating motion to facilitate machining discharges thereat without the disadvantage that the machining action may not be restricted by the frequency of the vibration.

The control circuit 30 is operated so as to increase the frequency of the vibration when the gap voltage drops as a result of the development of a short-circuiting or arc discharge and to reduce the frequency when a normal discharge is resumed. It may also be operate so as to permit the vibration to continue at a low or zero amplitude, as long as discharges proceed in a normal mode, and to increase the vibration amplitude when a short circuit or arcing develops.

Figure 8:
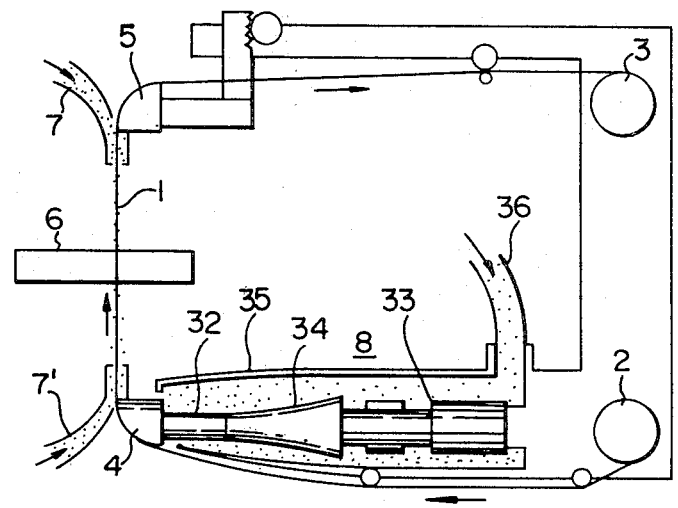
FIG. 8 is a diagrammatic cross-sectional view illustrating a still further embodiment of the invention including means for cooling the body of the vibrator in accordance with an additional aspect of the invention.

FIG. 8 shows an embodiment of the invention in which a vibrator unit, here comprising a vibratile head 32, a transducer 33 and a transmitting horn 34, is cooled by a coolant fluid. The vibrator head 32 is disposed in contact with one of wire support and guide members 4 and 5 and the entire vibrator arrangement is received in a housing 35 filled with the coolant fluid introduced therein through an inlet 36 although only the head portion 32 may alternatively be received in such a housing 35.

As a vibration is continuously applied, the vibrating head tends to heat up so that the mechanical accuracy of such machine parts as guide members may deteriorate and the vibration in a desired mode may not be achieved with the result of discontinuance of vibration with a stability and even of the breakage of the wire electrode. Such disadvantages are effectively overcome with the cooling arrangement of FIG. 8.

As the coolant fluid, the machining liquid may be used; a gas such as air may likewise be utilized.

According to another aspect of the invention, the machining liquid (i.e. water) of an electric resistivity in a range between $5 \times 10^2$ and $5 \times 10^4$ ohm-cm, much lower than those used heretofore, is advantageously utilized, especially when a vibration or undulating oscillatory motion at a frequency not less than 100 Hz and preferably in a range between 10 and 50 kHz is imparted to the travelling wire electrode displaced transversely relative to the workpiece. It has been a common requirement in the art of EDM that a machining liquid, e.g. Kerosine, transformer oil of a sufficient dielectric strength or electric resistivity be used or, as the machining liquid, water processed or distilled to have an electric resistivity not less than $10^6$ to $10^7$ ohm-cm be employed so that the machining gap to be provided between the electrode and the workpiece must be sufficiently narrow (typically 10 to 20 microns) to allow electrical discharge to be readily produced thereacross. As a consequence, the removal of machining chips and other products from the machining gap has not readily been effected and the resulting production of arcing and shortcircuiting has undesirably limited the machining stability and the machining current, hence the removal rate or cutting speed attainable.

It has now been found that the use of water machining fluid of a low resistivity in a range set forth above allows the use of a machining gap expanded in size 2 to 3 times, thus facilitating the removal of machining products and further has the result of an increased machining current and stability. It should also be noted that municipal-supply water not particularly processed, viz. of a resistivity between $10^2$ and $10^3$ ohm-cm may be directly utilized.

EXAMPLE IV

Using a copper wire electrode of a diameter of 0.02 mm, a workpiece composed of SKD-11 was machined with electrical pulses of a pulse duration of 5 microseconds, a pulse off-time of 20 microseconds and a pulse peak current of 27 amperes. Municipal-supply water machining liquid was used with its resistivity varied from 10 ohm-cm to $10^7$ ohm-cm by an ion-exchange processing.

Figure 9:
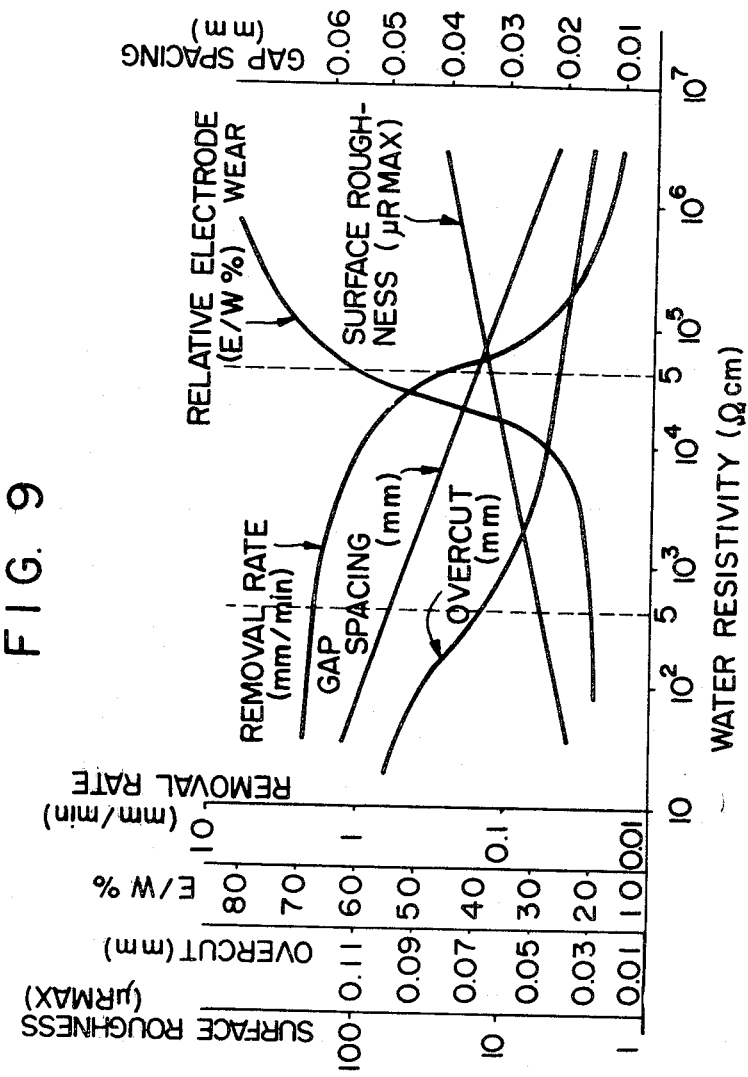
FIG. 9 is a graphical representation showing several machining characteristics (plotted along the ordinate) vs. the resistance of machining liquid (plotted along the abscissa) to show a preferred range of the latter for better machining results.

In FIG. 9, there are shown results obtained accordingly in which the spacing of the machining gap in mm, the removal rate in mm/minute, the relative electrode wear in %, the overcut in mm and the surface roughness in uRmax are plotted along the ordinate against the resistivity in ohm-cm of water machining liquid along abscissa. It is seen that the machining gap which must be 0.01 to 0.02 mm with the use of distilled water of a resistivity of $10^6$ to $10^7$ ohm-cm as conventional may be expanded to 0.04 to 0.05 mm when its resistivity remains as low as $10^2$ to $10^4$ ohm-cm. The removal rate increases sharply when the resistivity is varied to less than $5 \times 10^4$ ohm-cm, whereas the relative electrode wear decreases sharply at a resistivity lowered to $10^4$ to $5 \times 10^5$ ohm-cm. It been specifically noted that a relative electrode wear which is 80% at a resistivity higher than $10^6$ drops to 20% at a resistivity of $10^3$ to $10^4$ ohm-cm. The overcut which increases with the decrease of the resistivity rises sharply at a resistivity in the range of $10^2$ to $5 \times 10^2$ ohm-cm whereas the surface roughness uRmax is reduced with the decrease of the resistivity.

From these machining characteristics, it will be evident that better machining results are obtainable with water machining liquid whose resistivity ranges between $5 \times 10^4$ ohm-cm and $5 \times 10^2$ ohm-cm, the former being the value around which the removal rate increases markedly whereas the relative electrode wear drops and the latter being the value around which the overcut increases with the result of drop in the machining accuracy.

Figure 10:
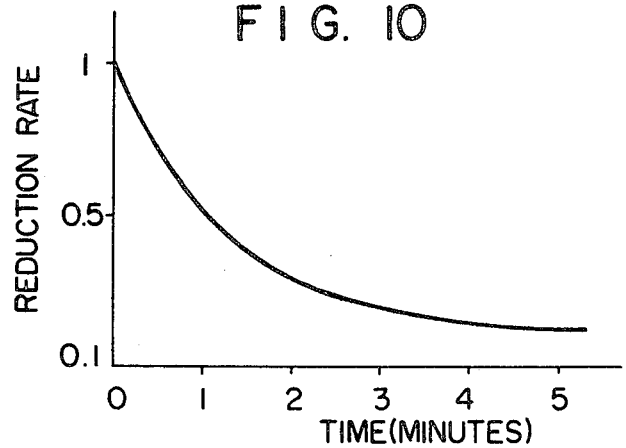
FIG. 10 is likewise a graphical representation showing the change of resistance of machining liquid (plotted along the ordinate) with respect to lapse of time (plotted along the abscissa)

It has also been observed that the resistivity of machining liquid while subjected to electrical discharges in the machining gap decreases gradually with lapse of time. In FIG. 10, there is shown a graph indicating how the resistivity of water which has an initial resistivity of $50 \times 10^4$ ohm-cm varies with respect to time plotted in units of minutes. A possible explanation for this change is that the resistance coefficient of water is negative with respect to rise in its temperature and the rate of dissolution of carbon dioxide from air and hence its absolute concentration dissolved in water increase with rise of the temperature. This clearly indicates why it is important to flush or pass the machining liquid through the machining zone. The resistivity change may also be avoided by travelling the electrode through the machining zone as noted previously. Thus, with both measures taken, it will be evident that an electrical discharge machining operation with a maximum efficiency and accuracy can be effected by using water machining liquid whose resistivity is in a range between $5 \times 10^2$ and $5 \times 10^4$ ohm-cm.

Figure 11:
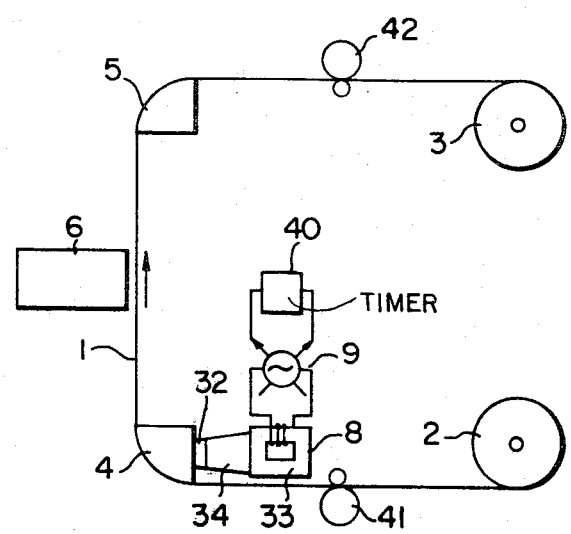
FIG. 11 is a diagrammatic cross sectional view of a modified embodiment of the invention including a unit designed to optimize the mode of operation of the wire vibrator.

In FIG. 11, there is shown a further modified embodiment of the invention in which a timer 40 is provided for the transducer energizing oscillator 9 to variably control the operating condition of the vibrator unit 8 in the manner to vary the positions or number of loops or nodes of an undulating vibration imparted to the travelling wire electrode during the course of a machining operation.

Figures 12A, 12B, 12C:
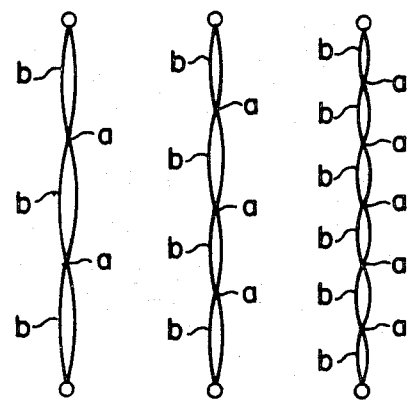
FIGS. 12(a), (b) and (c) are diagrammatic view illustrating a wire electrode vibrating with difference numbers of nodes and loops.

As noted previously, the vibrator unit 8 is provided with a vibratile head 32, a transmitting horn 34 and a transducer 33 and, when the latter is energized by the oscillator 9, the head 32 actuated through the transmitter applies a vibration to the guide member 4 so that an undulating vibration having nodes a and loops b as illustrated in FIG. 12 is imparted to the wire electrode 1 travelling under tension between the guide members 4 and 5 and propagated into the machining zone between the workpiece 6 and the wire electrode 1. The mode of the undulating vibration is properly regulated by adjustment of the distance between the guide members 4 and 5, the tension applied to the wire electrode 1 and the frequency and the amplitude of the oscillator 9.

If the undulating vibration characteristics are held constant, those portions of the workpiece which confront the loops and those portions which confront the nodes will, respectively, remain constant so that the loop confronting portions may be cut excessively compared with the node confronting portions, bringing about an irregularly machined or undulatingly profiled frontal cut surface in the workpiece. This disadvantage is overcome by the embodiment of FIG. 11.

In the system of FIG. 11, the time control unit 40 is designed to change the oscillating frequency of the oscillator 9 at predetermined time intervals. As readily appreciated, by changing the oscillating frequency of the oscillator 9, the numbers of undulations created on the wire electrode 1 between the guide members 4 and 5 will be altered and the position of the nodes and the loops thereof displaced. If the wire electrode which has been vibrating in a mode of FIG. 12(a) has its vibrating frequency increased by increasing the frequency of the oscillator 9, the wire vibration in a mode of FIG. 12(b) or (c) will develop with a corresponding displacement of nodes and loops. It follows that if any combination of modes of vibration (a), (b) and (c) are alternated at preselected time intervals, there results a constant change or displacement of the positions of the undulating nodes and loops, assuring an uniformly machined frontal surface in the workpiece.

For the purpose of changing modes of vibration in accordance with this aspect of the invention, various modifications may be made. Thus, a ring counter circuit may be employed to establish the modes of vibration (a), (b) and (c) successively. The displacement of nodes and loops may also be effected by changing tension applied to the wire electrode 1 between the guide members 4 and 5 through control on the brake roller 41 and the drive roller 42. It is also possible to change the distance between the guide members 4 and 5 periodically or to provide a third guide member (not shown) between them and alter its position periodically.

I claim:

1. A method of electrically machining a conductive workpiece, comprising the steps of:

juxtaposing the workpiece with a traveling-wire electrode supported between a pair of guide members across said workpiece;

relatively displacing said traveling wire electrode and said workpiece transversely to the axis of said traveling-wire electrode and defining a machining gap therebetween;

supplying a machining liquid to said gap;

applying a series of electrical pulses across said workpiece and said electrode to generate machining discharges in the gap to remove material from the workpiece, and imparting a vibration at a frequency between 1 and 50 kHz and an amplitude between 1 and 50 microns intermediate said guide members to said traveling-wire electrode in a direction transverse to the axis thereof so that said traveling-wire electrode has an undulating oscillatory motion along said axis with more than two nodes and antinodes or loops with a maximum amplitude smaller than the size of said machining gap in said direction.

2. The method defined in claim 1 wherein the amplitude of the vibration is between about 1 and about 50 microns.

3. The method defined in claim 2 wherein the amplitude of the vibration is between about 1 and about 5 microns.

4. The method defined in claim 1 wherein the wire electrode is stretched and travelled between a pair of guide members and the vibration is imparted to the wire electrode in the vicinity of one of said guide members.

5. The method defined in claim 4 wherein said one of said guide members is cooled by a coolant.

6. The method defined in claim 1 wherein the plane of said vibration is controlled to be held in coincidence with the direction of cutting by said wire electrode of the workpiece.

7. The method defined in claim 1 wherein a parameter of said vibration is controlled in response to the monitored machining condition in said machining gap.

8. The method defined in claim 1 wherein said machining liquid is water of a resistivity between about $5 \times 10^2$ and about $5 \times 10^4$ ohm-cm.

9. In an apparatus for the electrical machining of a conductive workpiece wherein a wire electrode is spanned between a pair of guides, and is axially displaced between said guides, said electrode and said workpiece being relatively displaced while defining a machining gap therebetween supplied with a machining liquid, and electric pulses are applied across the workpiece and the electrode to generate machining discharges across said gap, the improvement which comprises:

means for imparting, during the generation of said discharge, a vibration at a frequency not less than 100 Hz and an amplitude between 1 and 50 microns intermediate said guides to said wire electrode traveling therebetween in a direction transverse to the axis thereof so that said traveling-wire electrode has an undulating oscillatory motion along said axis with more than two nodes and antinodes or loops with a maximum amplitude smaller than the size of said machining gap in said direction.

10. The improvement defined in claim 9, further comprising means for controlling the direction of the amplitude of the undulating oscillatory motion of said wire to coincide with the direction of relative displacement of said workpiece and said wire electrode during the machining of said workpiece.

11. The improvement defined in claim 9, further comprising means responsive to a parameter of a condition of said machining gap connected to said vibration-imparting means for controlling a parameter of the vibration imparted to said traveling-wire electrode in response to said condition.

12. The improvement defined in claim 9 wherein said liquid is water having a resistivity of $5 \times 10^2$ to $5 \times 10^4$ ohm-cm.

13. The improvement defined in claim 9 wherein said vibration-imparting means includes a magnetostrictive element forming a guide channel for said wire electrode.

14. The improvement defined in claim 9 wherein said means is connected to one of said guides, further comprising means for cooling said one of said guides.

15. The improvement defined in claim 9 wherein said means comprises an electromechanical transducer energizable by a high-frequency power supply for producing a high-frequency oscillation therein and a horn structure connected to said transducer and having a tip in contact with or in close proximity to said traveling-wire electrode.

* * * * *